(12) United States Patent
Ikeda

(10) Patent No.: US 7,895,534 B2
(45) Date of Patent: Feb. 22, 2011

(54) INFORMATION PROCESSING APPARATUS, CONTROL METHOD THEREFOR, AND PROGRAM

(75) Inventor: Hiromi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

(21) Appl. No.: 11/006,602

(22) Filed: Dec. 8, 2004

(65) Prior Publication Data

US 2005/0132301 A1    Jun. 16, 2005

(30) Foreign Application Priority Data

Dec. 11, 2003    (JP)    ............... 2003-413835

(51) Int. Cl.
*G06F 3/048* (2006.01)
(52) U.S. Cl. ............... 715/855; 715/860; 715/863
(58) Field of Classification Search ........... 715/738, 715/855–863
See application file for complete search history.

(56) References Cited

U.S. PATENT DOCUMENTS

| 5,315,313 | A | | 5/1994 | Shinagawa | ............... 345/145 |
| 5,754,177 | A | | 5/1998 | Hama et al. | ............... 715/862 |
| 6,038,555 | A | * | 3/2000 | Field et al. | ............... 706/21 |
| 6,160,556 | A | | 12/2000 | Kinoe et al. | ............... 345/419 |
| 7,260,535 | B2 | * | 8/2007 | Galanes et al. | ............... 704/270 |
| 2001/0018654 | A1 | * | 8/2001 | Hon et al. | ............... 704/257 |
| 2002/0080197 | A1 | | 6/2002 | Masthoff | ............... 345/862 |
| 2002/0173955 | A1 | | 11/2002 | Reich | ............... 704/231 |
| 2003/0014377 | A1 | * | 1/2003 | Barson et al. | ............... 706/20 |
| 2003/0016252 | A1 | | 1/2003 | Noy et al. | ............... 345/856 |
| 2003/0093419 | A1 | | 5/2003 | Bangalore et al. | ............... 707/3 |
| 2004/0230434 | A1 | * | 11/2004 | Galanes et al. | ............... 704/270.1 |
| 2006/0053382 | A1 | * | 3/2006 | Gardner et al. | ............... 715/764 |

FOREIGN PATENT DOCUMENTS

| JP | 04-290172 | | 10/1992 |
| JP | 05-066885 | | 3/1993 |
| JP | 05-158605 | | 6/1993 |
| JP | 06-124097 | | 5/1994 |
| JP | 07-295784 | A | 11/1995 |
| JP | 08-305874 | | 11/1996 |
| JP | 10-254619 | | 9/1998 |
| JP | 11-185058 | | 7/1999 |
| JP | 11-306370 | | 11/1999 |
| JP | 2000-194691 | | 7/2000 |
| JP | 2000-250677 | | 9/2000 |
| JP | 2001-175397 | | 6/2001 |

* cited by examiner

*Primary Examiner*—Ba Huynh
(74) *Attorney, Agent, or Firm*—Fitzpatrick, Cella, Harper & Scinto

(57) ABSTRACT

When positional information in an operation window is input (designated), an interpretation result for an input position and a confidence score of the interpretation result are calculated on the basis of the input position information. Assume that a plurality of candidates are present as interpretation results. In presenting the candidates as the interpretation results in this case, the display contents are so changed as to have an enlarged image of a range within which the candidates as the interpretation results fall or the candidates are output using a changed output modality.

14 Claims, 12 Drawing Sheets

FIG. 2
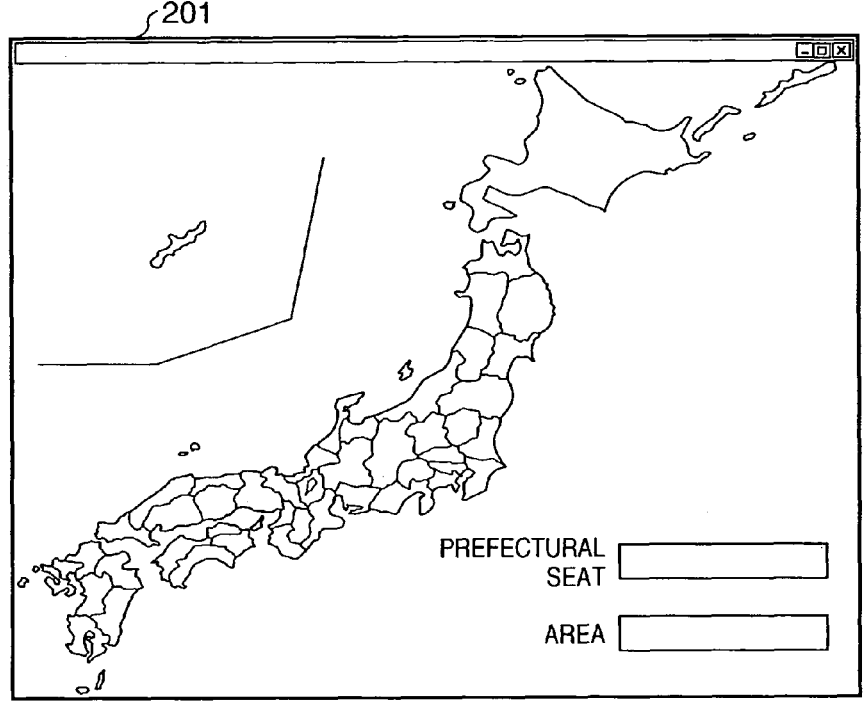
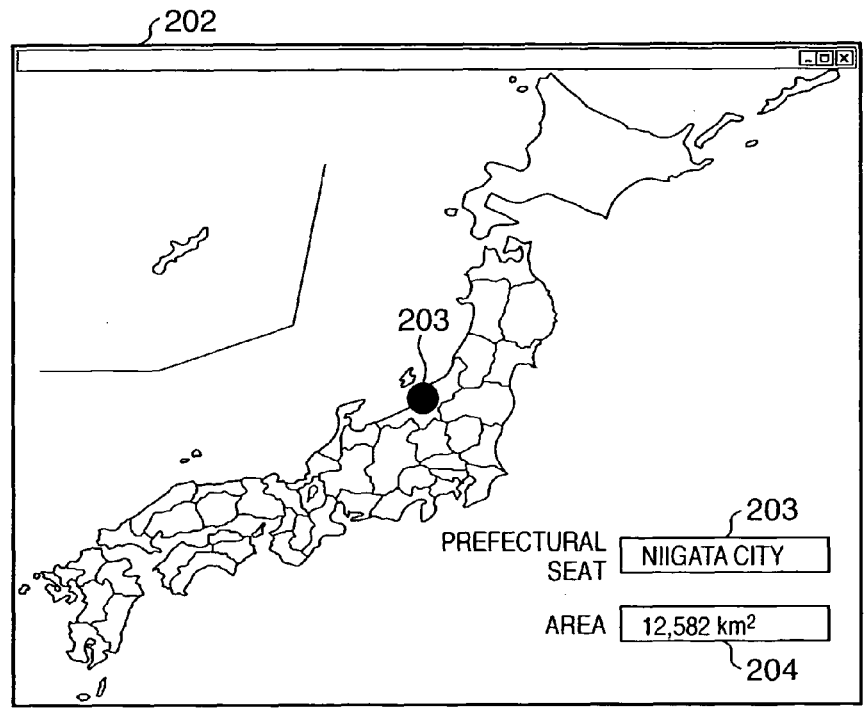

FIG. 3

301

| PREFECTURES INCLUDING METROPOLIS | PREFECTURAL SEAT | AREA [km²] |
|---|---|---|
| HOKKAIDO | SAPPORO CITY | 78,517 |
| AOMORI PREFECTURE | AOMORI CITY | 9,606 |
| IWATE PREFECTURE | MORIOKA CITY | 15,278 |
| MIYAGI PREFECTURE | SENDAI CITY | 7,285 |
| AKITA PREFECTURE | AKITA CITY | 11,612 |
| ... | ... | ... |
| NIIGATA PREFECTURE | NIIGATA CITY | 12,582 |
| ... | ... | ... |
| OITA PREFECTURE | OITA CITY | 6,338 |
| MIYAZAKI PREFECTURE | MIYAZAKI CITY | 7,734 |
| KAGOSHIMA PREFECTURE | KAGOSHIMA CITY | 9,187 |
| OKINAWA PREFECTURE | NAHA CITY | 2,271 |

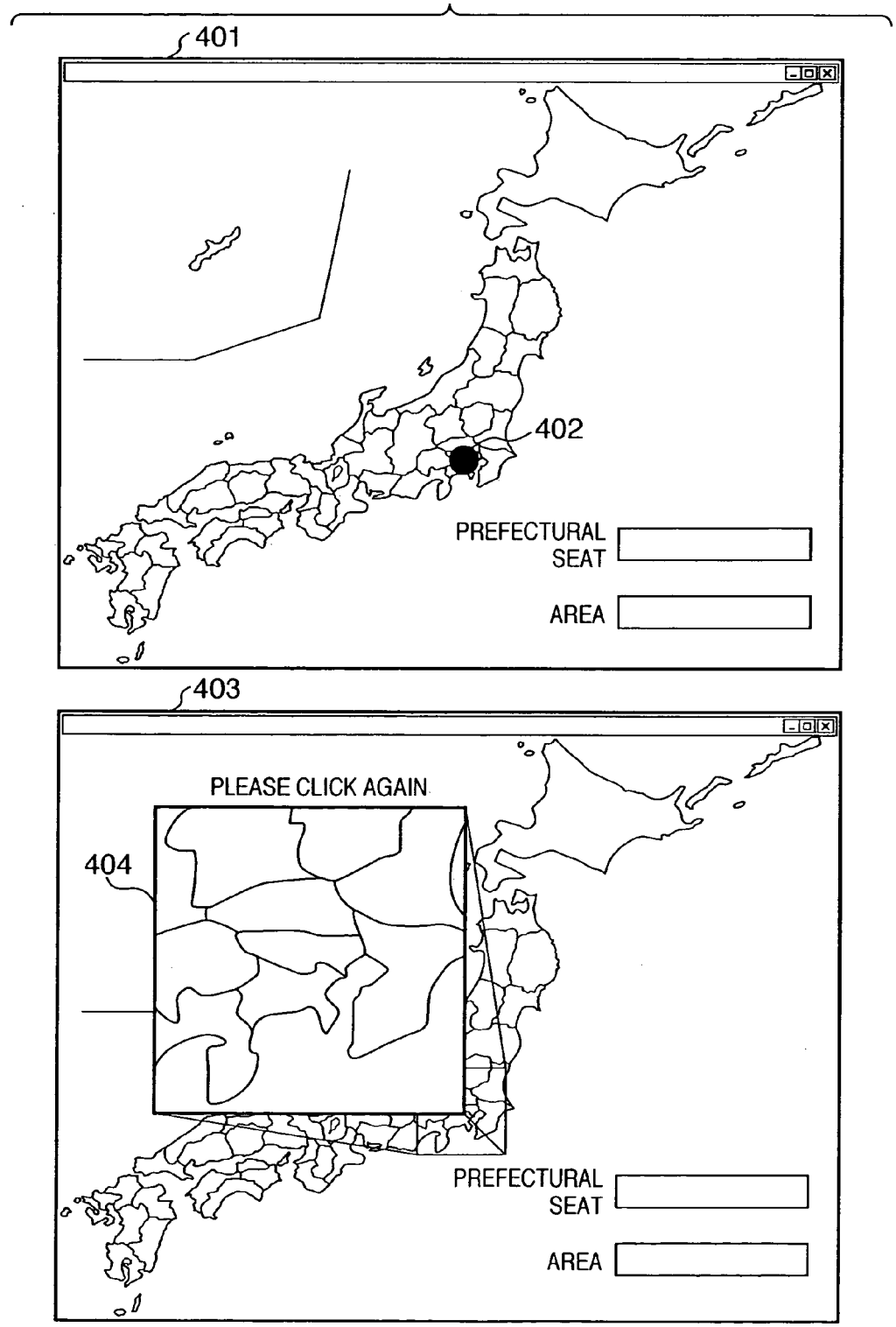

FIG. 5
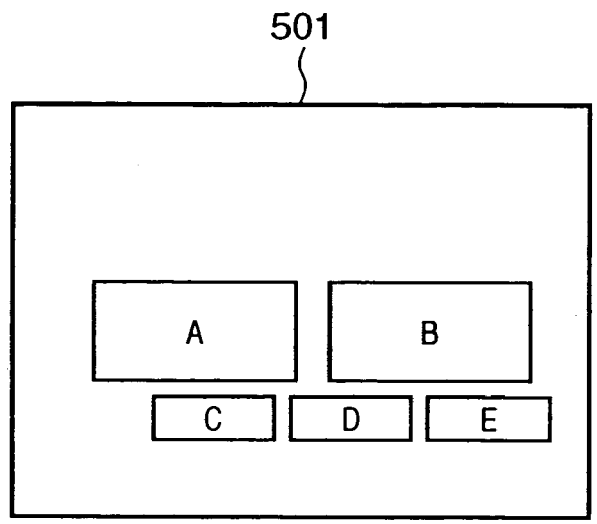
501
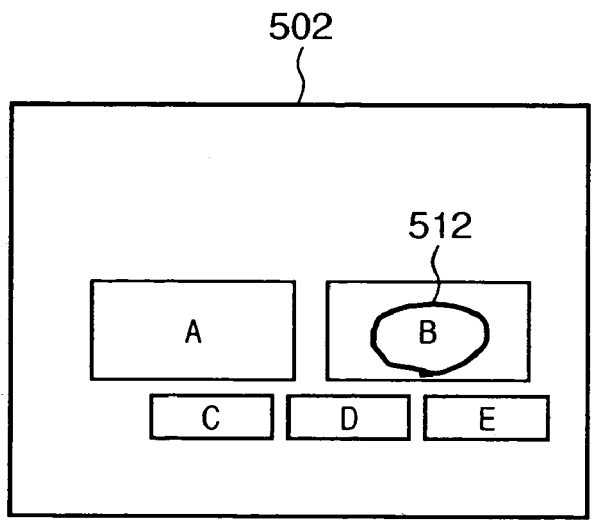
502
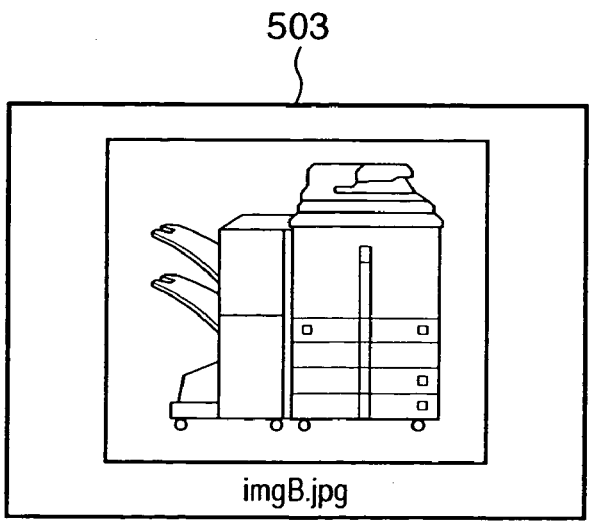
503

| OBJECT | PROCESS |
|--------|---------|
| A | DISPLAY imgA.jpg |
| B | DISPLAY imgB.jpg |
| C | DISPLAY imgC.jpg |
| D | DISPLAY imgD.jpg |
| E | DISPLAY imgE.jpg |

FIG. 7
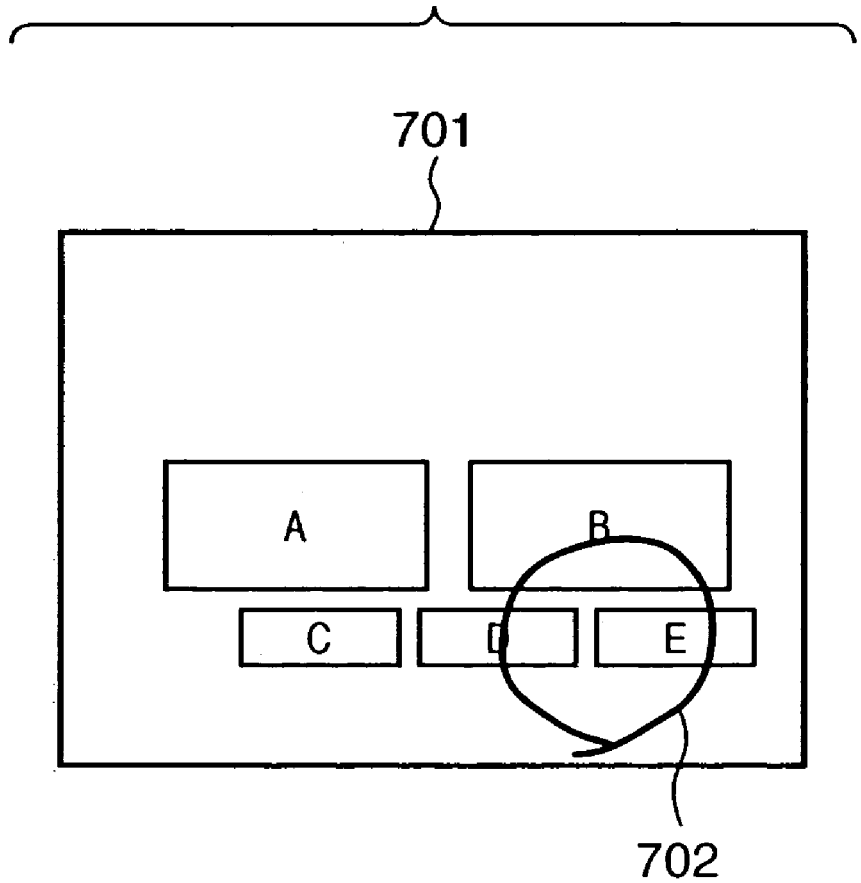
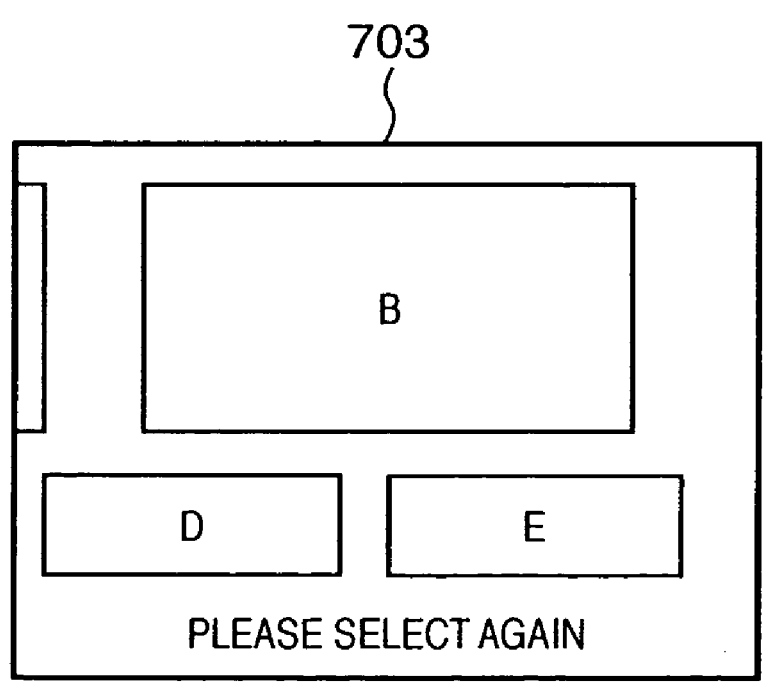

FIG. 11
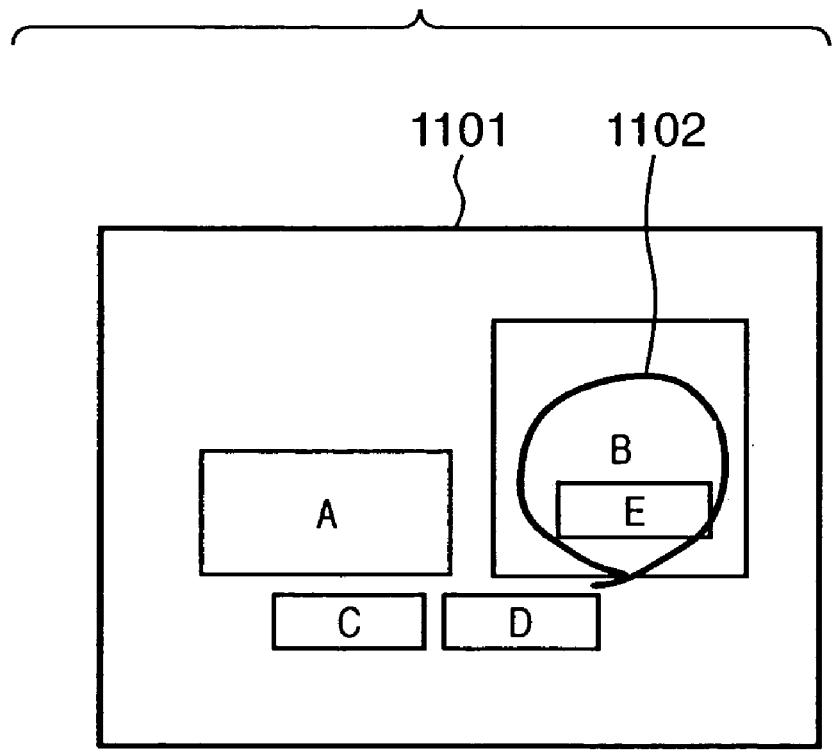
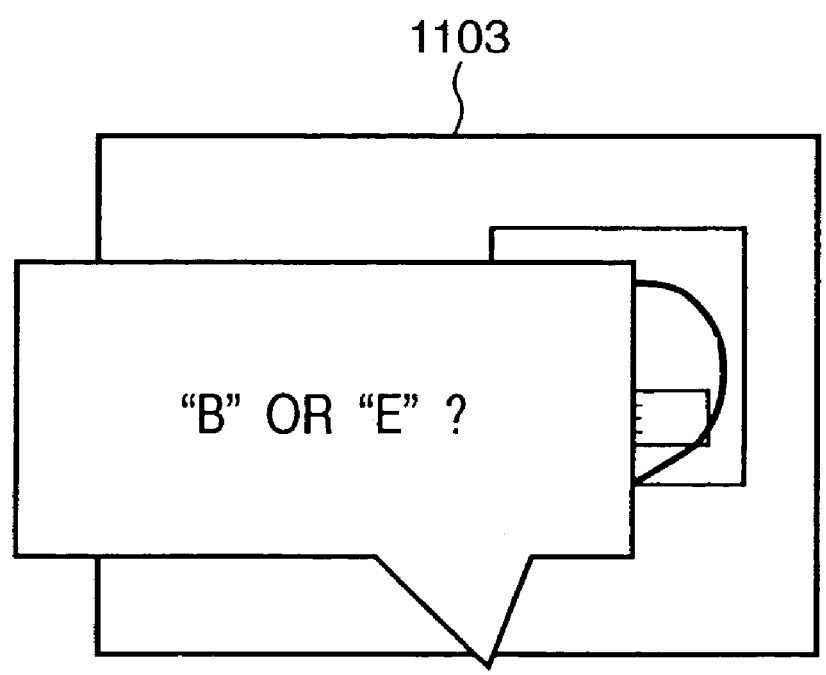

US 7,895,534 B2

INFORMATION PROCESSING APPARATUS, CONTROL METHOD THEREFOR, AND PROGRAM

FIELD OF THE INVENTION

The present invention relates to an information processing apparatus, control method therefor, and program which control a process for input position information on the basis of the position information.

BACKGROUND OF THE INVENTION

A conventional system which comprises an input interface using a speech recognition technique or character recognition technique performs a subsequent process if a candidate with the highest confidence score, out of results of recognition for input speech or input characters, has a high confidence score. On the other hand, if the candidate with the highest confidence score has a low confidence score, other candidates are presented together with the candidate with the highest confidence score, and the user is prompted to select one from the presented candidates or input data again.

As for this technique, there is also disclosed a method in which the user selects one from other candidates using another input modality such as a finger, pen, or the like if erroneous recognition occurs in speech synthesis (see, e.g., Japanese Patent Laid-Open No. 7-295784). With this method, the user can easily cope with erroneous recognition.

Even with the method described in Japanese Patent Laid-Open No. 7-295784, the use of any other input modality may not increase the convenience of selection in designating a certain position on a map.

SUMMARY OF THE INVENTION

The present invention has been made in consideration of the above-mentioned problem, and has as its object to provide an information processing apparatus, control method therefor, program which can implement an operation environment convenient to the user in, presenting a plurality of candidates as results of interpretation for position information such as coordinates, a range, or the like input by the user.

According to the present invention, the foregoing object is attained by providing an information processing apparatus which controls a process for input position information on the basis of the position information, comprising:

receive means for receiving input position information in an operation window;

calculation means for calculating an interpretation result for an input position and a confidence score of the interpretation result on the basis of the input position information received by the receive means; and change means for changing display contents in the operation window on the basis of the confidence score calculated by the calculation means in presenting a candidate for the interpretation result.

In a preferred embodiment, the change means changes the display contents on the basis of the confidence score calculated by the calculation means such that the display contents have an enlarged image of a range within which the candidate for the interpretation result falls.

In a preferred embodiment, the change means changes the display contents on the basis of the confidence score calculated by the calculation means such that a range within which the candidate for the interpretation result falls is enlarged.

In a preferred embodiment, the apparatus further comprises output modality change means for changing an output modality for output in presenting the candidate for the interpretation result.

In a preferred embodiment, the output modality change means changes the output modality to speech.

In a preferred embodiment, the apparatus further comprises control means for executing at least one of the change means and the output modality change means on the basis of the confidence score calculated by the calculation means.

According to the present invention, the foregoing object is attained by providing an information processing apparatus which controls a process for input position information on the basis of the position information, comprising:

receive means for receiving input position information in an operation window;

calculation means for calculating an interpretation result for an input position and a confidence score of the interpretation result on the basis of the input position information received by the receive means; and output modality change means for changing an output modality for output in presenting a candidate for the interpretation result.

In a preferred embodiment, the output modality change means changes the output modality to speech.

In a preferred embodiment, the apparatus further comprises change means for changing display contents in the operation window on the basis of the confidence score calculated by the calculation means in presenting the candidate for the interpretation result.

In a preferred embodiment, the change means changes the display contents on the basis of the confidence score calculated by the calculation means such that the display contents have an enlarged image of a range within which the candidate for the interpretation result falls.

In a preferred embodiment, the change means changes the display contents on the basis of the confidence score calculated by the calculation means such that a range within which the candidate for the interpretation result falls is enlarged.

In a preferred embodiment, the apparatus further comprises control means for executing at least one of the change means and output modality change means on the basis of the confidence score calculated by the calculation means.

According to the present invention, the foregoing object is attained by providing a control method for an information processing apparatus which controls a process for input position information on the basis of the position information, comprising:

a receive step of receiving input position information in an operation window;

a calculation step of calculating an interpretation result for an input position and a confidence score of the interpretation result on the basis of the input position information received in the receive step; and a change step of changing display contents in the operation window on the basis of the confidence score calculated in the calculation step in presenting a candidate for the interpretation result.

According to the present invention, the foregoing object is attained by providing a control method for an information processing apparatus which controls a process for input position information on the basis of the position information, comprising:

a receive step of receiving input position information in an operation window;

a calculation step of calculating an interpretation result for an input position and a confidence score of the interpretation result on the basis of the input position information received in the receive step; and an output modality change step of changing an output modality for output in presenting a candidate for the interpretation result.

According to the present invention, the foregoing object is attained by providing a program for implementing control of an information processing apparatus which controls a process for input position information on the basis of the position information, comprising program codes of:

a receive step of receiving input position information in an operation window;

a calculation step of calculating an interpretation result for an input position and a confidence score of the interpretation result on the basis of the input position information received in the receive step; and a change step of changing display contents in the operation window on the basis of the confidence score calculated in the calculation step in presenting a candidate for the interpretation result.

According to the present invention, the foregoing object is attained by providing a program for implementing control of an information processing apparatus which controls a process for input position information on the basis of the position information, comprising program codes of:

a receive step of receiving input position information in an operation window;

a calculation step of calculating an interpretation result for an input position and a confidence score of the interpretation result on the basis of the input position information received in the receive step; and an output modality change step of changing an output modality for output in presenting a candidate for the interpretation result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view for explaining an operation example of the information processing system according to the first embodiment of the present invention;

FIG. 3 is a chart showing an example of data according to the first embodiment of the present invention;

FIG. 4 is a view for explaining another operation example of the information processing system according to the first embodiment of the present invention;

FIG. 5 is a view for explaining still another operation example of the information processing system according to the first embodiment of the present invention;

FIG. 6 is a chart showing an example of data according to the first embodiment of the present invention;

FIG. 7 is a view for explaining still another operation example of the information processing system according to the first embodiment of the present invention;

FIG. 11 is a view for explaining another operation example of the information processing system according to the second embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
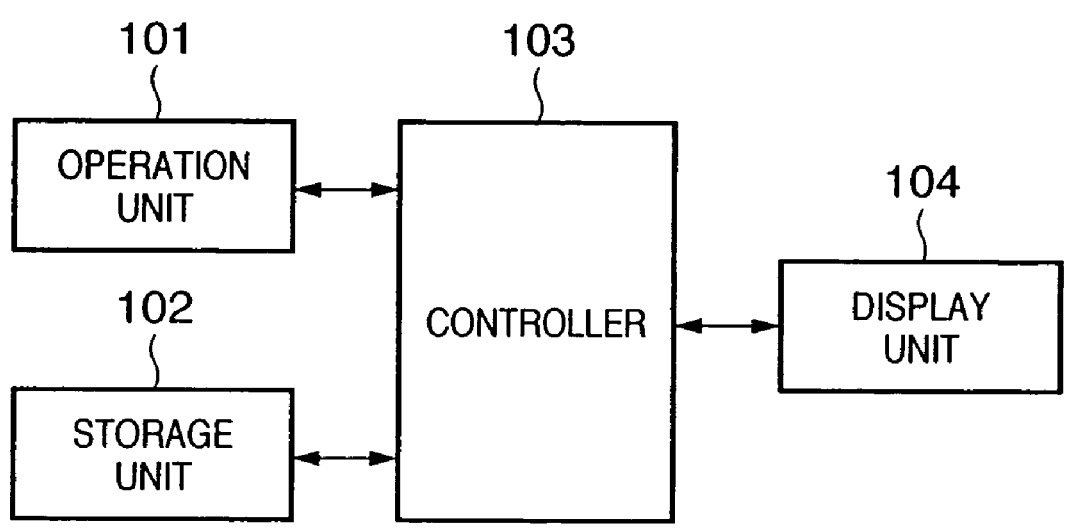
FIG. 1 is a block diagram showing the basic arrangement of an information processing system according to the first embodiment of the present invention.

FIG. 1 is a block diagram showing the basic arrangement of an information processing system according to the first embodiment of the present invention.

The information processing apparatus according to the first embodiment comprises an operation unit 101, storage unit 102, controller 103, and display unit 104, as shown in FIG. 1.

The operation unit 101 comprises an input device such as a group of buttons, keyboard, mouse, touch panel, pen, tablet, or the like and functions as an input interface for inputting various kinds of instructions, text data, and the like to the information processing system.

The storage unit 102 comprises a hard disk drive for storing various kinds of information, a storage medium such as a CD-ROM or DVD-ROM for supplying various kinds of information to the information processing system, or the like.

The hard disk drive or storage medium which implements the storage unit 102 stores various kinds of application programs, user interface control program, various kinds of data required to execute the programs, and the like. These programs are loaded into the information processing system under the control of the controller 103 on the subsequent stage.

The controller 103 comprises a work memory (e.g., a RAM), CPU, MPU, ROM, or the like and executes various kinds of processes by reading the programs and data stored in the storage unit 102.

The display unit 104 comprises a display device such as a liquid crystal display, CRT display, or the like and displays various kinds of information comprised of an image, character, and the like. As the display unit 104, a touch-panel-type display device may be employed. In this case, the display unit 104 also has a function of the operation unit 101 (i.e., a function of inputting various kinds of instructions to the information processing system).

The information processing system may be implemented by, e.g., a general-purpose computer such as a personal computer (information processing apparatus). The standard components of the general-purpose computer include, e.g., a CPU, RAM, ROM, hard disk, external storage device, network interface, display, keyboard, mouse, microphone, speaker, and the like.

Operation examples of the information processing system according to the first embodiment having the above-mentioned arrangement will be described with reference to FIGS. 2 to 4.

FIG. 2 is a view for explaining an operation example of the information processing system according to the first embodiment of the present invention.

Reference numeral 201 in FIG. 2 denotes an operation window displayed on the display unit 104, which displays a map of Japan. The map of Japan consists of objects of the metropolis and districts. The user can designate an arbitrary object and output information corresponding to the designated object.

This example particularly shows an arrangement in which when the user clicks (designates) an arbitrary point on the map in the operation window 201, one of prefectures including the metropolis (objects) to which the clicked point belongs is interpreted to output the area and prefectural seat. Thus, the information processing system receives position information of the arbitrary point, and interprets it to specify the object.

To interpret a prefecture from the clicked point, an existing technique of, e.g., ranking a prefecture which makes up the largest proportion of the area of the clicked point as the first is utilized. The result of interpreting the clicked point on the map is obtained (calculated) with a confidence score (the degree which indicates the intention to designate an object).

Note that a confidence score may be obtained from each object in the operation window or from each object within a predetermined range centering on the clicked point.

The results of interpreting the clicked point are ranked (as the first, second, . . . ) in descending order of confidence score. Let R be (confidence score of first-ranked interpretation result)−(confidence score of Nth-ranked interpretation result). If only the first-ranked interpretation result satisfies (R<threshold value) out of obtained interpretation results, the area and prefectural seat of the first-ranked prefecture are output from a correspondence table (stored in, e.g., the storage unit 102) which holds the areas and prefectural seats of the respective prefectures in FIG. 3 onto the operation window.

An operation window 202 in FIG. 2 shows this example. Assume that "the first rank: Niigata Prefecture (the confidence score=95, R=0)", "the second rank: Nagano Prefecture (the confidence score=10, R=85)", and "the third rank: Gunma Prefecture (the confidence score=5, R=90)" are obtained as interpretation results of a clicked point 203. If the predetermined threshold value for R is 30, only the first-ranked interpretation result out of the obtained interpretation results satisfies (R<threshold value (30)). The prefectural seat "Niigata City" and area "10,938 km$^2$" of "Niigata Prefecture" are output to the display field 203 and a display field 204, respectively, on the operation window 202 from the correspondence table shown in FIG. 3.

On the other hand, if a plurality of interpretation results satisfy (R<threshold value), the user is prompted to input again. In this case, the first- to third-ranked interpretation results are handled as candidates, and the image of a range within which the plurality of candidates fall is presented in an enlarged scale.

To define the range, within which the plurality of candidates fall, coordinates previously stored in the storage unit 102 are used. An existing image processing technique is used to enlarge an image.

An operation window 401 in FIG. 4 shows an example of this case. Assume that "the first rank: Tokyo Metropolis (the confidence score=70, R=0)", "the second rank: Saitama Prefecture (the confidence score=60, R=10)", and "the third rank: Kanagawa Prefecture (the confidence score=50, R=$_{20}$)" are obtained as interpretation results of a clicked point 402. If the predetermined threshold value for R is 30, the first- to third-ranked interpretation results out of the obtained interpretation results satisfy (R<threshold value (30)). Accordingly, the user is prompted to input again.

At this time, an image 404 of a range within which "Tokyo Metropolis", "Saitama Prefecture", and "Kanagawa Prefecture" fall is presented in an enlarged scale, as shown in an operation window 403 in FIG. 4. The image may be presented in an enlarged scale while centering on the clicked point.

Still another operation example of the information processing system according to the first embodiment will be described with reference to FIGS. 5 to 7.

FIG. 5 is a view for explaining still another operation example of the information processing system according to the first embodiment of the present invention.

Reference numeral 501 in FIG. 5 denotes an operation window displayed on the display unit 104, which displays objects A to E.

This example particularly shows an arrangement in which the user interprets an object from a range designated by drawing an arbitrary graphic (e.g., a circle) on the operation window 501 through the operation unit 101 and performs a process assigned to the object.

The process performed when each object is selected is as shown in the correspondence table in FIG. 6 (stored in, e.g., the storage unit 102).

To interpret an object from the range designated by the circle, an existing technique of, e.g., ranking an object which makes up the largest proportion of the area of the circle as the first is utilized. The result of interpreting the object is obtained with a confidence score.

As described in the example of FIG. 2, if only the first-ranked interpretation result satisfies (R<threshold value) out of obtained interpretation results, the process corresponding to an object which corresponds to the interpretation result is performed. On the other hand, if a plurality of interpretation results satisfy (R<threshold value), the image of a range which contains the plurality of candidates is presented in an enlarged scale, and the user is prompted to input again.

For example, if only the first interpretation result "object B" is designated by a circle 512 and satisfies (R<threshold value), as shown in an operation window 502 in FIG. 5, FIG. 6 is referred to, and a process corresponding to the object B is performed. More specifically, an image having a file name "imgB.jpg" is displayed, as shown in an operation window 503 in FIG. 5.

On the other hand, if a plurality of candidates (e.g., the object B and objects D and E) are designated by a circle 702 and satisfy (R<threshold value), as shown in an operation window 701 in FIG. 7, the image of a range within which the objects B, D, and E fall is presented in an enlarged scale, and the user is prompted to input again. Similarly to the above-mentioned example, coordinates previously stored in the storage unit 102 are used to define the range containing the plurality of candidates, and an existing image processing technique is used to enlarge an image.

A process executed by the image processing system according to the first embodiment will be described with reference to FIG. 8.

Figure 8:
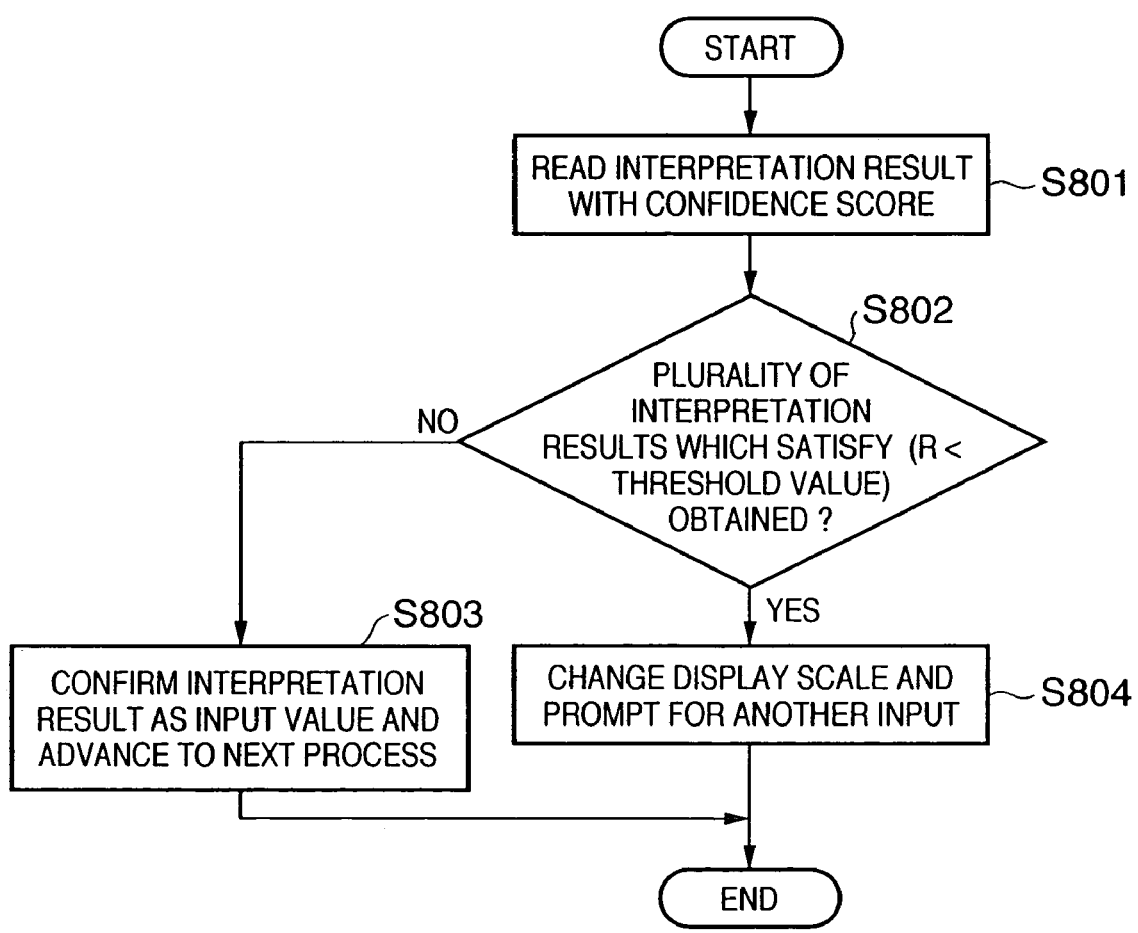
FIG. 8 is a flowchart showing a process executed by the information processing system according to the first embodiment of the present invention.

FIG. 8 is a flowchart showing the process executed by the information processing system according to the first embodiment of the present invention.

FIG. 8 shows an example of a process performed when an interpretation result with a confidence score is returned from an interpretation function which interprets a user input.

When an interpretation result with a confidence score is returned, the interpretation result is read (step S801). As described above, let R be (confidence score of first-ranked interpretation result)−(confidence score of Nth-ranked interpretation result). It is determined whether a plurality of interpretation results satisfy (R <threshold value) out of obtained interpretation results (step S802).

If only one interpretation result, i.e., the first-ranked interpretation result satisfies (R<threshold value) (NO in step S802), the interpretation result is confirmed as an input value, and the flow advances to the next process (of, e.g., outputting a recognition result, executing a command process corresponding to the recognition result, or the like) (step S803).

On the other hand, if a plurality of interpretation results satisfy (R<threshold value) (YES in step S802), the display scale (size) of a currently displayed operation window or the display scale (size) of the objects indicated by the interpretation results in the operation window is changed, and the user is prompted to input again (step S804).

The information processing system according to the first embodiment has a function of presenting an operation window or a candidate (object) itself in an enlarged scale as long as a plurality of candidates fit in if the plurality of candidates are obtained as interpretation results.

The user of an existing image processing technique makes it possible to easily implement image enlargement.

As described above, according to the first embodiment, if a plurality of candidates are obtained as interpretation results, an image is presented in an enlarged scale as long as the plurality of candidates fit in, and the user is prompted to input again. This facilitates another input by the user and can increase the convenience.

Second Embodiment

The first embodiment has described an arrangement in which an image is presented in an enlarged scale as long as a plurality of candidates fit in, and another input is prompted, if the plurality of candidates are obtained as recognition results. The second embodiment will describe an arrangement in which an output modality is changed to present a plurality of candidates, and another input is prompted, if the plurality of candidates are obtained as recognition results.

In the second embodiment, the output modality corresponds to, e.g., an image output function, speech output function, or the like.

Figure 9:
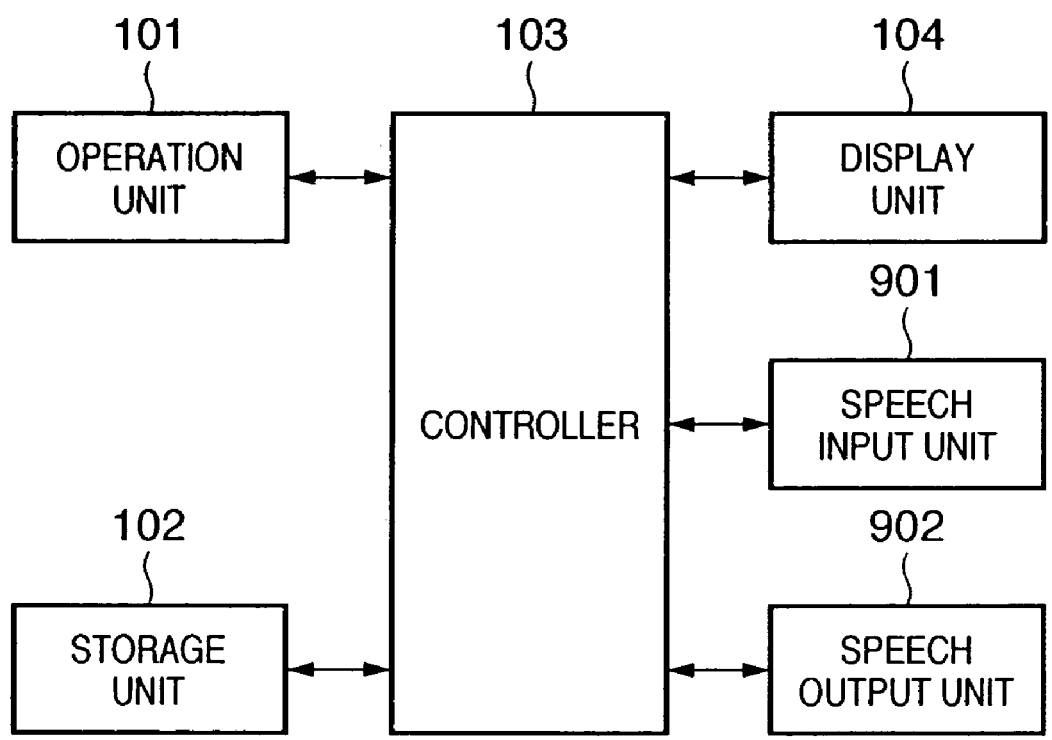
FIG. 9 is a block diagram showing the basic arrangement of an information processing system according to the second embodiment of the present invention.

FIG. 9 is a block diagram showing the basic arrangement of an information processing system according to the second embodiment of the present invention.

The information processing system according to the second embodiment has a speech input unit 901 and speech output unit 902 in addition to the arrangement in FIG. 1 according to the first embodiment, as shown in FIG. 9.

The speech input unit 901 comprises a microphone, A/D converter, or the like and receives speech of the user.

Speech input from the speech input unit 901 may be recorded or may be subjected to speech recognition which is a known technique. Text data input from an operation unit 101 may be subjected to speech synthesis under the control of a controller 103, thereby obtaining speech data.

The speech output unit 902 comprises a speaker, headphone, D/A converter, or the like and performs a speech synthesis process. In the speech synthesis process, the speech output unit 902 creates speech data from read-out text under the control of the controller 103, D/A-converts the speech data, and externally outputs the converted data as a sound. A known technique is used to perform the speech synthesis process.

An operation example of the information processing system according to the second embodiment having the above-mentioned arrangement will be described with reference to FIGS. 10 and 11.

Figure 10:
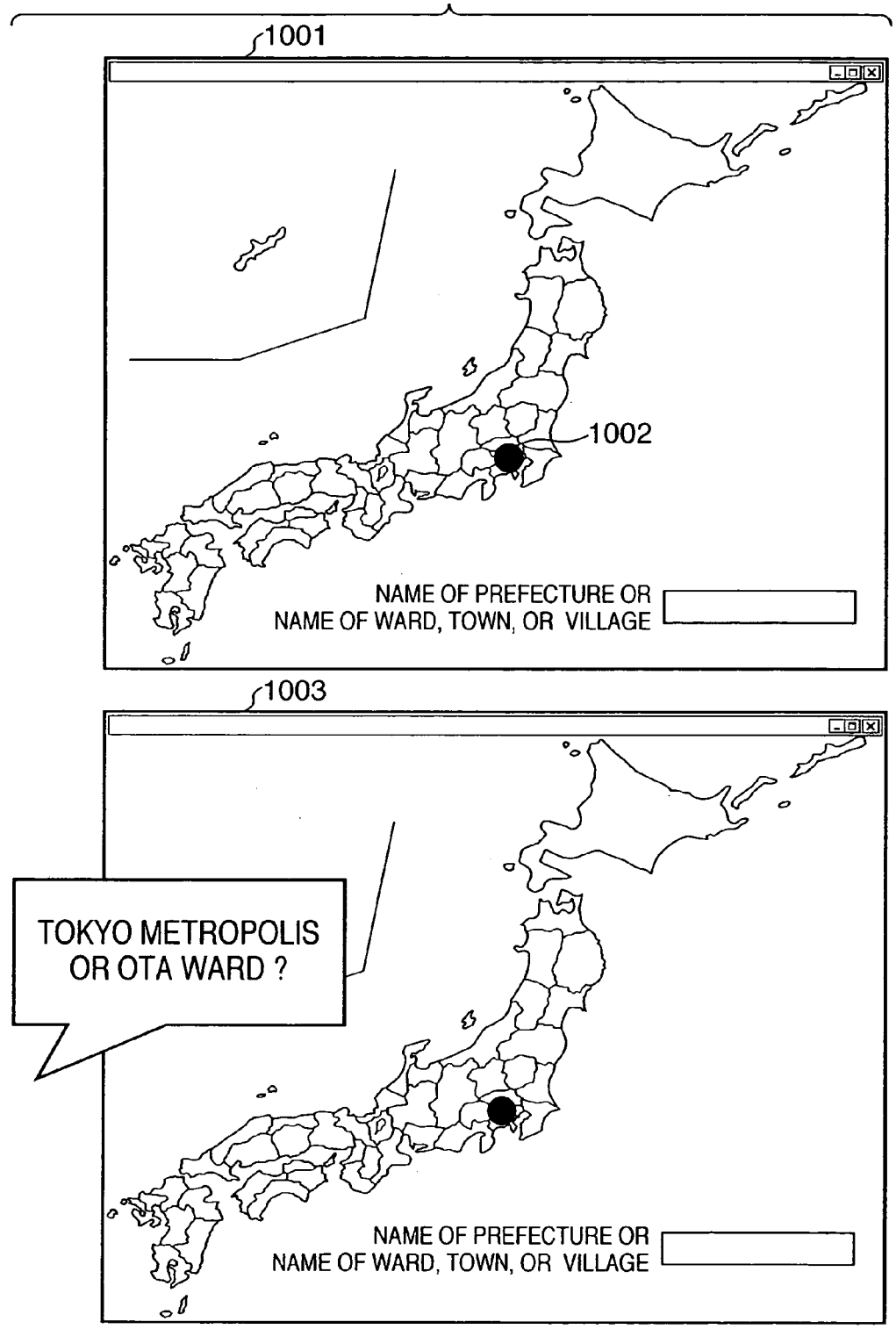
FIG. 10 is a view for explaining an operation example of the information processing system according to the second embodiment of the present invention.

FIG. 10 is a view for explaining the operation example of the information processing system according to the second embodiment of the present invention.

Reference numeral 1001 in FIG. 10 denotes an operation window displayed on the display unit 104, which displays a map of Japan.

This example particularly shows an arrangement in which when the user clicks (designates) an arbitrary point on the map through the operation unit 101, either of one of prefectures including the metropolis (objects) or one of wards, towns, and villages to which the clicked point belongs is interpreted to output the name of the prefecture, ward, town, or village.

To interpret a prefecture, ward, town, or village from the clicked point, an existing technique is used, similarly to the first embodiment. The result of interpreting the clicked point on the map can be obtained with a confidence score.

Similarly to the first embodiment, the results of interpreting the clicked point are ranked (as the first, second, . . . ) in order of decreasing confidence score. Let R be (confidence score of first-ranked interpretation result)−(confidence score of Nth-ranked interpretation result). If only the first-ranked interpretation result satisfies (R<threshold value) out of obtained interpretation results, the name of the first-ranked prefecture, ward, town, or village is output onto the operation window.

On the other hand, if a plurality of interpretation results satisfy (R<threshold value), the user is prompted to input again. In this case, the plurality of candidates are presented by voice using an existing speech synthesis technique.

An operation window 1003 in FIG. 10 shows this example. Assume that "the first rank: Tokyo Metropolis (the confidence score=70, R=0)" and "the second rank: Ota Ward (the confidence score=60, R=10)" are obtained as interpretation results of a clicked point 1002. If the predetermined threshold value for R is 30, the first- and second-ranked interpretation results out of the obtained interpretation results satisfy (R<threshold value (30)). For example, a synthetic voice "Tokyo Metropolis or Ota Ward?" is presented, and the user is prompted to input again. The interpretation results may be presented in descending order of confidence score or in the order in which they are displayed.

Another operation example of the information processing system according to the second embodiment will be described with reference to FIG. 11.

FIG. 11 is a view for explaining another operation example of the information processing system according to the second embodiment of the present invention.

Reference numeral 1101 in FIG. 11 denotes an operation window displayed on the display unit 104, which displays objects A to E.

This example particularly shows an arrangement in which when the user interprets an object from a range designated by drawing an arbitrary graphic (e.g., a circle) on the operation window 1101 through the operation unit 101 and performs a process assigned to the object.

The process performed when each object is selected is as shown in the correspondence table in FIG. 6 (stored in, e.g., the storage unit 102).

To interpret an object from the range designated by the circle, an existing technique is used, similarly to the first embodiment. The result of interpreting the object designated by the circle can be obtained with a confidence score.

Similarly to the first embodiment, if only the first-ranked interpretation result satisfies (R<threshold value) out of obtained interpretation results, the process corresponding to the object is performed. On the other hand, if a plurality of interpretation results satisfy (R<threshold value), the plurality of candidates are presented using speech synthesis, and the user is prompted to input again.

For example, if a plurality of candidates (e.g., the objects B and E) are designated by a circle 1102 and satisfy (R<threshold value), as shown in an operation window 1101 in FIG. 11, a synthetic voice "B or E?" is presented to prompt for another input, as shown in an operation window 1103. The candidates may be presented in descending order of confidence score or in the order in which they are displayed.

A process executed by the image processing system according to the second embodiment will be described with reference to FIG. 12.

Figure 12:
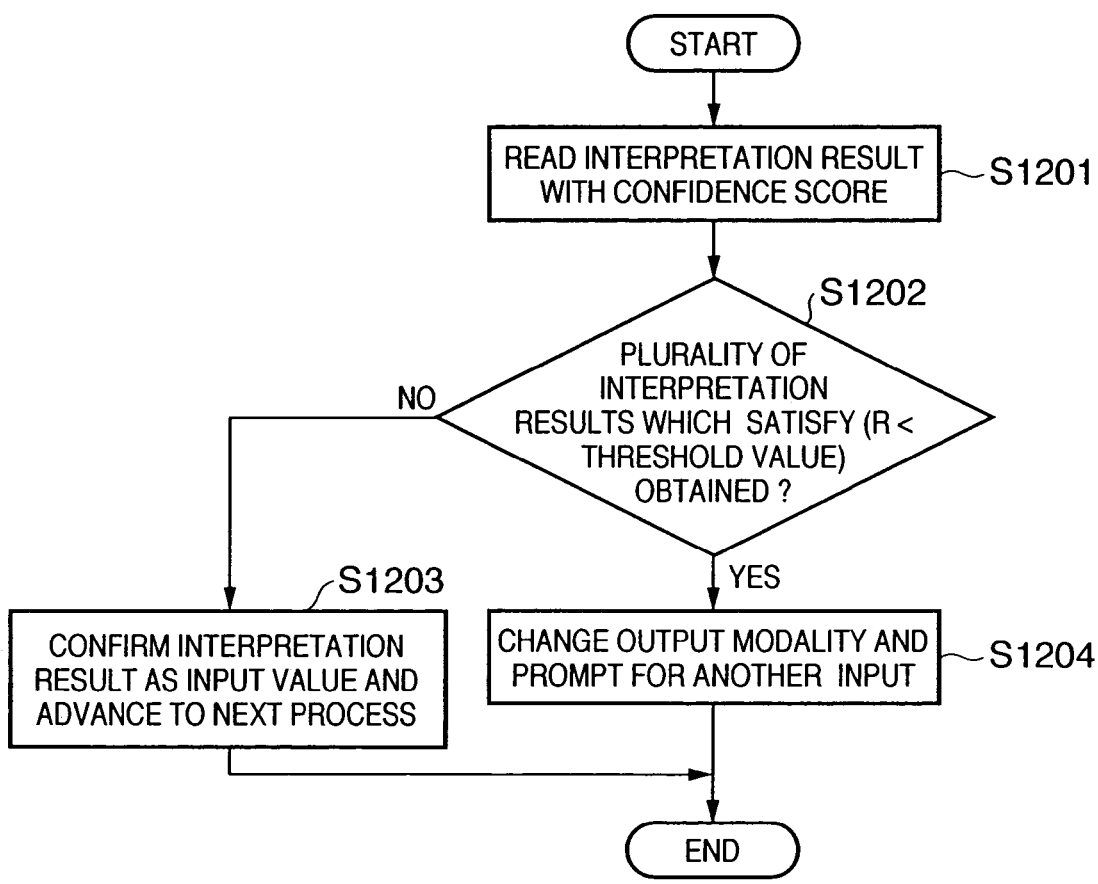
FIG. 12 is a flowchart showing a process executed by the information processing system according to the second embodiment of the present invention.

FIG. 12 is a flowchart showing the process executed by the information processing system according to the second embodiment of the present invention.

FIG. 12 shows an example of a process performed when an interpretation result with a confidence score is returned from an interpretation function which interprets a user input.

When an interpretation result with a confidence score is returned, the interpretation result is read (step S1201). As described above, let R be (confidence score of first-ranked interpretation result)–(confidence score of Nth-ranked interpretation result). It is determined whether a plurality of interpretation results satisfy (R<threshold value) out of obtained interpretation results (step S1202).

If only one interpretation result, i.e., the first-ranked interpretation result satisfies (R<threshold value) (NO in step S1202), the interpretation result is confirmed as an input value, and the flow advances to the next process (of, e.g., outputting a recognition result, executing a command process corresponding to the recognition result, or the like) (step S1203).

On the other hand, if a plurality of interpretation results satisfy (R<threshold value) (YES in step S1202), the output modality is changed to speech to prompt for another input (step S1204). The information processing system according to the second embodiment has a function of presenting a plurality of candidates using a changed output modality to prompt for another input.

Speech is merely an example of an output modality. The output modality may be changed to another modality.

As described above, according to the second embodiment, if a plurality of candidates are obtained as recognition results, these candidates are presented using a changed output modality to prompt for another input. This is easy for the user to understand, and the convenience can be increased.

As described above, according to the first and second embodiments, in presenting a plurality of candidates as results of interpretation for position information such as coordinates, a range, or the like input by the user, an interface convenient to the user can be provided by changing the output scale or output modality.

Third Embodiment

A plurality of candidates may be presented using the first and second embodiments in combination in accordance with the application purpose.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-413835 filed on Dec. 11, 2003, the entire contents of which are hereby incorporated by reference herein.

What is claimed is:

1. An information processing apparatus which controls a process for determining a desired object in a map displayed on a display unit on the basis of input position information within the map, comprising:
   a receiving unit that receives input of a range of the map;
   a calculation unit that calculates an interpretation result of an object in the map for the input and a confidence score for the interpretation result on the basis of the range received by said receiving unit;
   a determination unit that
      ranks interpretation results for the input from said calculation unit in descending order of their confidence scores calculated by said calculation unit,
      calculates R, wherein R is the difference between the confidence score of the first-ranked interpretation result and the confidence score of an interpretation result,
      compares R with a threshold value, and
      determines one or more candidates from among the interpretation results satisfying the relation that R is less than the threshold value; and
   a display unit that enlarges and displays on the display unit a portion of the map within which the candidate(s) fall(s).

2. The apparatus according to claim 1, further comprising an outputting unit that, when one candidate is determined by said determination unit, outputs the candidate as an interpretation result, and wherein said display unit enlarges and displays a range within which the candidate(s) fall(s) in a case in which a plurality of candidates are determined by said determination unit.

3. The apparatus according to claim 2, wherein said display unit generates and displays a map having an enlarged image of a range within which the candidates fall.

4. The apparatus according to claim 2, wherein said display unit enlarges portion of a map within which the candidates fall.

5. An information processing apparatus which controls a process for determining a desired object in a map displayed on a display unit on the basis of input position information within the map, comprising:
   a receive unit that receives input of position information with respect to the map;
   a calculation unit that calculates an interpretation result of an object in the map for the input and a confidence score for the interpretation result on the basis of the position information received by said receive unit; and
   a determination unit that
      ranks interpretation results for the input from said calculation unit in descending order of their confidence scores calculated by said calculation unit,
      calculates R, wherein R is the difference between the confidence score of the first-ranked interpretation result and the confidence score of an interpretation result,
      compares R with threshold value, and
      determines one or more candidates from among the interpretation results satisfying the relation that R is less than the threshold value; and
   a display unit that enlarges and displays on the display unit a portion of the map within which the candidate(s) fall(s).

6. The apparatus according to claim 5, further comprising an outputting unit that, when one candidate is determined by said determination unit, outputs the candidate as an interpretation result, and wherein said display unit enlarges and displays a range within which the candidate(s) fall(s) in a case in which a plurality of candidates are determined by said determination unit.

7. The apparatus according to claim 6, wherein said display unit enlarges and displays a map within which the candidates fall while centering on a position indicated by the position information received by said receive unit.

8. A computer-implemented control method of an information processing apparatus which controls a process for determining a desired object in a map displayed on a display unit on the basis of input position information within the map, comprising:
   a receive step of receiving input of a range of the map;
   a calculation step of calculating an interpretation result of an object in the map for the input and a confidence score for the interpretation result on the basis of the range received in said receive step;
   a determination step of
      ranking interpretation results for the input from said calculation step in descending order of their confidence scores calculated in said calculation step,
      calculating R, wherein R is the difference between the confidence score of the first-ranked interpretation result and the confidence score of an interpretation result,
      comparing R with a threshold value, and
      determining one or more candidates from among the interpretation results satisfying the relation that R is less than the threshold value; and
   a display step of enlarging and displaying on the display unit a portion of the map within which the candidate(s) fall(s).

9. A non-transitory computer-readable storage medium, storing, in executable form, a program for causing a computer to execute a control method according to claim 8.

10. The method according to claim 8, further comprising an outputting step of, when one candidate is determined in said determination step, outputting the candidate as an interpretation result, and wherein said display step includes enlarging and displaying on the display unit a range within which the candidate(s) fall(s) in a case in which a plurality of candidates are determined in said determination step.

11. A computer-implemented control method of an information processing apparatus which controls a process for determining a desired object in a map displayed on a display unit on the basis of input position information within the map, comprising:
   a receive step for receiving input of position information with respect to the map;
   a calculation step for calculating an interpretation result of an object in the map for the input and a confidence score for the interpretation result on the basis of the position information received in said receive step; and
   a determination step for
      ranking interpretation results for the input from said calculation step in descending order of their confidence scores calculated in said calculation step, calculating R, wherein R is the difference between the confidence score of the first-ranked interpretation result and the confidence score of an interpretation result, comparing R with a threshold value, and determining one or more candidates from among the interpretation results satisfying the relation that R is less than the threshold value; and a display step for enlarging and displaying on the display unit a portion of the map within which the candidate(s) determined in said determination step fall(s).

12. The method according to claim 11, wherein said display step includes enlarging and displaying on the display unit the map within which the candidates determined in said determination step fall while centering on a position indicated by position information received in said receive step.

13. A non-transitory computer-readable storage medium, storing, in executable form, a program for causing a computer to execute a control method according to claim 11.

14. The method according to claim 11, further comprising an outputting step of, when one candidate is determined in said determination step, outputting the candidate as an interpretation result, and wherein said display step includes enlarging and displaying on said display unit a range within which the candidate(s) fall(s) in a case in which a plurality of candidates are determined in said determination step.

* * * * *